Patented Nov. 2, 1937

2,098,083

UNITED STATES PATENT OFFICE 2,098,083

SYNTHETIC RESIN ADHESIVE

Albert Henry Bowen and Theodore Williams Dike, Seattle, Wash., assignors to I. F. Laucks, Inc., Seattle, Wash., a corporation of Washington No Drawing. Application November 21, 1934, Serial No. 754,178

20 Claims. (Cl. 91—68)

The present invention relates to new and useful manufactured products resulting from the use of certain carbohydrates and/or proteins in conjunction with solutions of urea resins. More particularly our invention embraces the products resulting from the use of urea resins modified by carbohydrates and/or proteins for sizing paper and cloth and for adhesives in the coating of paper and cloth. More particularly, our invention relates to the use of the urea resin compounds which are the subject of our co-pending United States application Serial No. 666,930, filed April 19, 1933, now Patent No. 1,992,180 of which this application is a continuation in part, together with carbohydrates and/or proteins in the manufacture of new and useful sizes and adhesives for paper and cloth.

In certain types of paper, such as poster and some label stock, both wet strength and varnish resistance are desirable. These properties may be obtained, though expensively, by long beating, giving a more highly hydrated stock as done at the present time. The same properties however may be obtained by surface sizing practically any type of paper with the material made according to the examples given herewith, thus saving both time and expense.

To the accomplishment of the foregoing and related ends, the invention, then comprises the features hereinafter fully described, and particularly pointed out in the claims, the following description setting forth in detail certain illustrative embodiments of the invention, these being indicative however, of but few of the various ways, in which the principle of the invention may be employed.

As an example, a concentrated size is made as follows, all parts being by weight: To 600 parts of commercial formalin is added 10 parts of zinc chloride. After the zinc chloride has dissolved, 100 parts of diethylene glycol are added and then 18 parts of animal glue dissolved in 90 parts of water are added. After these ingredients are well mixed 250 parts of urea are added. The temperature of this mixture is kept below 100° F. for four hours, no external heat being applied, in which time a mush has formed. For the sizing operation 10 parts of the foregoing mush are dissolved in 90 parts of water and 0.02 part of oxalic acid added as an insolubilizing agent. The size is applied in the same manner as any other surface size.

Paper sized with this solution has an increased wet tear resistance of 25% to 50%. The wet abrasion resistance may be increased 1000%. The treated paper will have varnish resistance even though the raw material was news print.

Another example of a concentrated size would be formalin 600 parts, zinc chloride 10 parts, diethylene glycol 100 parts, thin boiling starch 60 parts in water 300 parts, urea 250 parts. This formula will be seen to be the same as in the first example with the exception of starch replacing animal glue. The quality of the finished product will be equal in every way to that in the first example.

A third example may be given as follows: formalin 600 parts, zinc chloride 10 parts, diethylene glycol 100 parts, animal glue 9 parts, and thin boiling starch 30 parts in 195 parts of water, urea 250 parts. The final product resulting from this formula will be of the same quality as in the two previous examples.

We may state as a fourth example formalin 600 parts, zinc chloride 10 parts, diethylene glycol 100 parts, casein 50 parts dissolved in urea 50 parts and water 50 parts, and urea 250 parts.

As a fifth example one can use, formalin 600 parts, zinc chloride 10 parts, diethylene glycol 100 parts, gum arabic 80 parts dissolved in 200 parts of water, urea 250 parts.

The products resulting from any of the above examples will be equally efficient when used for sizing paper or cloth.

For the diethylene glycol in the above examples other plasticizers may be substituted with equally good results, and in some cases plasticizers may be left out entirely.

In making an adhesive for paper or cloth coating the procedure would be changed as shown in the following example, all parts being by weight. Dissolve 200 parts of zinc chloride in 1100 parts of formalin. Add 400 parts of urea and heat to 170° F., holding the mixture at that temperature for forty minutes and then cooling. This will form a liquid resin, or rather perhaps an aqueous resin solution, that has a life of many months. To make the coating adhesive add 20 parts of this liquid to a solution containing 3 parts animal glue and 2 parts thin boiling starch in 25 parts of water. This amount of adhesive mixture, 50 parts, will be sufficient for 100 parts of dry clay. The coating, after drying, may be insolubilized by the application of heat or an acid forming salt may be added to the coating mix before applying to the paper, in which case heat is unnecessary.

For coating cloth for window shades or for library buckram practically the same formula as given above may be employed. Slight changes will suggest themselves to those skilled in the art.

Other modes of applying the principle of our invention may be employed, change being made as regards the details described, provided the features stated in the following claims or the equivalent of such be employed.

We therefore particularly point out and distinctly claim as our invention:

1. A composition embodying a zinc chloride-urea-formaldehyde condensation product and a sizing adhesive agent from the group consisting of animal glue, casein, starch and gum arabic.

2. An adhesive embodying zinc chloride-urea-formaldehyde condensation product and a sizing carbohydrate.

3. An adhesive embodying zinc chloride-urea-formaldehyde condensation product and a sizing protein.

4. An adhesive embodying zinc chloride-urea-formaldehyde condensation product and a sizing protein and a carbohydrate.

5. An adhesive embodying urea-formaldehyde-zinc chloride resin and animal glue.

6. An adhesive embodying urea-formaldehyde-zinc chloride resin and starch.

7. An adhesive embodying urea-formaldehyde-zinc chloride resin and gum arabic.

8. A process of making adhesives, which comprises combining a zinc chloride-urea-formaldehyde condensation product and a sizing adhesive agent from the group consisting of animal glue, casein, starch and gum arabic.

9. In the process of making adhesives the step of embodying a sizing-carbohydrate with a zinc chloride-urea-formaldehyde condensation product.

10. In the process of making adhesives the step of embodying a sizing-protein with a zinc chloride-urea-formaldehyde condensation product.

11. In the process of making adhesives the step of embodying animal glue with a zinc chloride-urea-formaldehyde condensation product.

12. In the process of making adhesives the step of embodying starch with a zinc chloride-urea-formaldehyde condensation product.

13. As a new article of manufacture, sheet cellulosic material sized with a zinc chloride-urea-formaldehyde condensation product and a sizing-adhesive agent from the group consisting of animal glue, casein, starch and gum arabic.

14. As a new article of manufacture, sheet cellulosic material sized with a sizing-protein and a zinc chloride-urea-formaldehyde condensation product.

15. As a new article of manufacture, sheet cellulosic material sized with a sizing-carbohydrate and a zinc chloride-urea-formaldhyde condensation product.

16. As a new article of manufacture, paper sized with an adhesive embodying a zinc chloride-urea-formaldehyde condensation product and a sizing-carbohydrate.

17. As a new article of manufacture, paper sized with an adhesive embodying a zinc chloride-urea-formaldehyde condensation product and a sizing-protein.

18. As a new article of manufacture, paper sized with an adhesive embodying a zinc chloride-urea-formaldehyde condensation product and animal glue.

19. As a new article of manufacture, paper sized with an adhesive embodying a zinc chloride-urea-formaldehyde condensation product and starch.

20. As a new article of manufacture, paper sized with an adhesive embodying a zinc chloride-urea-formaldehyde condensation product and gum arabic.

ALBERT HENRY BOWEN.
THEODORE WILLIAMS DIKE.